US012667159B2

(12) United States Patent
Yang

(10) Patent No.: US 12,667,159 B2
(45) Date of Patent: Jun. 30, 2026

(54) WALKING-AID FOOTWEAR

(71) Applicant: Chin-Sung Yang, Taipei City (TW)

(72) Inventor: Chin-Sung Yang, Taipei City (TW)

( * ) Notice: Subject to any disclaimer, the term of this patent is extended or adjusted under 35 U.S.C. 154(b) by 0 days.

(21) Appl. No.: 18/884,136

(22) Filed: Sep. 13, 2024

(65) Prior Publication Data

US 2026/0076440 A1 Mar. 19, 2026

(51) Int. Cl.
*A43B 7/00* (2006.01)
*A61H 3/00* (2006.01)

(52) U.S. Cl.
CPC ................ *A43B 7/00* (2013.01); *A61H 3/00* (2013.01); *A61H 2003/007* (2013.01)

(58) Field of Classification Search
CPC .......... A43C 15/00; A43C 15/09; A45B 1/00; A45B 3/00; A45B 7/00; A45B 7/147; A45B 7/1475; A45B 7/1495; A45B 7/19; A45B 7/20; A45B 9/04; A61H 3/00; A61H 3/02; A61H 2300/001; A61H 2300/007
See application file for complete search history.

(56) References Cited

U.S. PATENT DOCUMENTS 2,005,507 A * 6/1935 Russell .................... A45B 9/04 135/65
2,431,748 A * 12/1947 Gershak ............... A43C 15/063 36/62
2,517,927 A * 8/1950 Reed ....................... F41A 23/18 36/1
3,077,678 A * 2/1963 Royer, Sr. ................ A43B 5/18 36/1
3,272,210 A * 9/1966 Boruvka .................. A61H 3/00 482/76
3,557,782 A * 1/1971 Wafer ...................... A61H 3/00 602/10
4,274,430 A * 6/1981 Schaaf ..................... A61H 3/00 135/65
4,697,808 A * 10/1987 Larson ................. A61H 1/0237 482/901
4,884,587 A * 12/1989 Mungons ................. A61H 3/00 135/65

(Continued)

FOREIGN PATENT DOCUMENTS

DE 102006044988 A1 * 4/2008 ......... A63B 21/4001
JP 2010082419 A * 4/2010

*Primary Examiner* — Heather Mangine
*Assistant Examiner* — Raquel M. Weis
(74) *Attorney, Agent, or Firm* — Leong C. Lei

(57) ABSTRACT

The walking-aid footwear has a coupling device installed on a shoe that connects to the lower portion of a cane. The coupling device includes a support plate and a coupling element. The support plate is attached to the sole of a shoe, while the coupling element is rotatably connected to the support plate to attach to the cane. A concealed-type coupling device is installed within a housing space in the sole and includes a casing, a coupling module, and release springs. The release springs are set inside the casing, and the coupling module is placed in the casing. The coupling module has an operation button that controls a latch pin. When the operation button is pressed, the latch pin disengages from the notches in the casing, allowing the release springs to push out the coupling module. The coupling element is then flipped upward to connect with the cane.

6 Claims, 14 Drawing Sheets

(56) References Cited

U.S. PATENT DOCUMENTS 4,958,650 A * 9/1990 Dale ...................... A63C 11/22 135/65
5,318,057 A * 6/1994 Wallum ................... A61H 3/02 135/65
5,467,793 A * 11/1995 Hart ......................... A61H 3/04 135/912
5,575,294 A * 11/1996 Perry ....................... A45B 3/00 600/595
5,865,203 A * 2/1999 Villano .................... A61H 3/00 135/65
5,954,075 A * 9/1999 Gilmour ............... A61F 5/0127 135/65
7,007,705 B1 * 3/2006 Thrower .................. A61H 3/00 135/65
7,087,030 B2 * 8/2006 Wang ........................ A61F 5/04 602/5
7,780,581 B1 * 8/2010 Emmert ................. A63B 25/10 135/65
7,954,502 B2 * 6/2011 Townsend ............ A61H 3/0277 135/84
11,311,449 B1 * 4/2022 Razon ...................... A61H 3/02
11,564,465 B1 * 1/2023 Hale ........................ A45B 9/04
2003/0136027 A1 * 7/2003 Brandt ..................... A43B 3/10 36/59 R
2003/0213510 A1 * 11/2003 MacCready ............. A61H 3/00 135/65
2004/0054309 A1 * 3/2004 Wang ........................ A61F 5/04 602/23
2006/0270951 A1 * 11/2006 Ikeuchi .................. B25J 9/0006 623/24
2006/0276728 A1 * 12/2006 Ashihara .............. A61H 1/0255 135/65
2007/0130804 A1 * 6/2007 Levy .................... A43B 1/0027 36/1
2008/0154165 A1 * 6/2008 Ashihara ................ B25J 9/0006 623/24
2008/0208096 A1 * 8/2008 Armitage .............. A61F 5/0102 602/28
2008/0318739 A1 * 12/2008 Ashihara .................. A61H 3/00 482/66
2013/0284222 A1 * 10/2013 Lu ............................ A45B 9/04 135/75
2014/0196757 A1 * 7/2014 Goffer ...................... A61H 3/02 135/69
2015/0272811 A1 * 10/2015 Choi ........................ B25J 17/00 74/490.04
2017/0340504 A1 * 11/2017 Sanz Merodio ....... B25J 9/0006
2018/0243156 A1 * 8/2018 Tryba ....................... A61H 3/02
2019/0231631 A1 * 8/2019 Campilii .................. A61H 3/04
2020/0206065 A1 * 7/2020 Yang .................... A61H 1/0237
2021/0378903 A1 * 12/2021 Mooney ................... A61H 3/00
2023/0293381 A1 * 9/2023 Wang ....................... A45B 9/02 601/5

* cited by examiner

WALKING-AID FOOTWEAR

BACKGROUND OF THE INVENTION

(a) Technical Field of the Invention

The present invention generally relates to footwear, and more particularly to a type of walking-aid footwear.

(b) Description of the Prior Art

When people are unable to maintain balance while walking, such as due to muscle deterioration from aging, they often use a cane for additional support. However, using a cane typically involves placing it as an additional point of support, then applying downward force with the hand to stabilize the cane before lifting the foot to walk forward. If the user has insufficient leg strength, the force from the hand may not be enough to assist in lifting the leg. For such users, even holding a cane may not make walking easier.

SUMMARY OF THE INVENTION

The main objective of the present invention is to provide walking-aid footwear that allows the user to use hand strength to lift their legs to assist with walking.

To achieve this objective, the walking-aid footwear is characterized by its main body including a coupling device for connecting to the lower portion of a cane, thereby providing upward assistance from the user's hand holding the cane to the main body.

In an embodiment, the main body is a shoe. The coupling device comprises a support plate and a coupling element. The support plate is positioned on an outer side of the main body. A bottom end of the support plate is attached to a bottom of the main body and the coupling element is rotatably connected to a top end of the outer side of the support plate for connecting with the lower portion of the cane.

The support plate is attached to the main body using screws. The coupling element is a clamp that grips an outer side of the lower portion of the cane. If the strength of the bottom of the main body is insufficient, at least one laterally extending reinforcement can be provided at the bottom of the main body. The reinforcement (not shown) can be aligned with the direction of the screws, bearing the force generated by the screws with their nuts. The coupling element can be a clamp that grips the outer side of the lower portion of the cane. The lower portion of the cane is cylindrical, allowing the clamp to grip around the lower portion. A user holding the cane can apply upward force with the hand to assist in lifting the main body and the foot, achieving the effect of assisted walking. When the user wearing the present invention needs to rise from a seated position, they can use the cane to help stand up.

In an embodiment, the main body is a shoe. The coupling device has a concealment design. The main body has a housing space. The housing space has a shoe body opening facing an outer side of the main body. The coupling device is installed within the housing space. The coupling device includes a casing, several release springs, and a coupling module. The casing has a housing opening facing the outer side of the main body. The coupling module is slidably installed inside the casing. Each release spring is attached to a side of the casing near an inner side of the main body, with a default position of each release spring pushing the coupling module out of the housing opening. The coupling module includes a box, a latch pin, an operation button, and a coupling element. The operation button is located to an end of a front side of the box. The latch pin is slidably installed within the box and protrudes from the box on one side, either near the front or rear side of the main body. The casing has several notches arranged at interval on an inner side, corresponding to the latch pin. When the operation button is pressed, the latch pin disengages from one of the notches. At an end of the box, near an outer side of the main body, an axle is configured, and the coupling element is attached to the axle, allowing it to flip from a horizontal to an upright position. The coupling element corresponds to the lower portion of the cane, enabling the cane to be rotatably and detachably connected to the coupling element.

In an embodiment, the main body is a base plate on which a shoe is placed. The coupling device includes a support plate and a coupling element. The support plate stands on an outer side of the main body, with its bottom end attached to the main body. The coupling element is rotatably connected to a top end of the outer side of the support plate to connect with the lower portion of the cane. A front end of the base plate is rotatably connected to an extendable front plate, and a support section extends upward from a rear end of the base plate. The extendable front plate and the base plate may each have a fastening device to secure the shoe, such as straps, buckles, or shoe-matching sockets. The extendable front plate may vary its length to fit shoes of different sizes.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
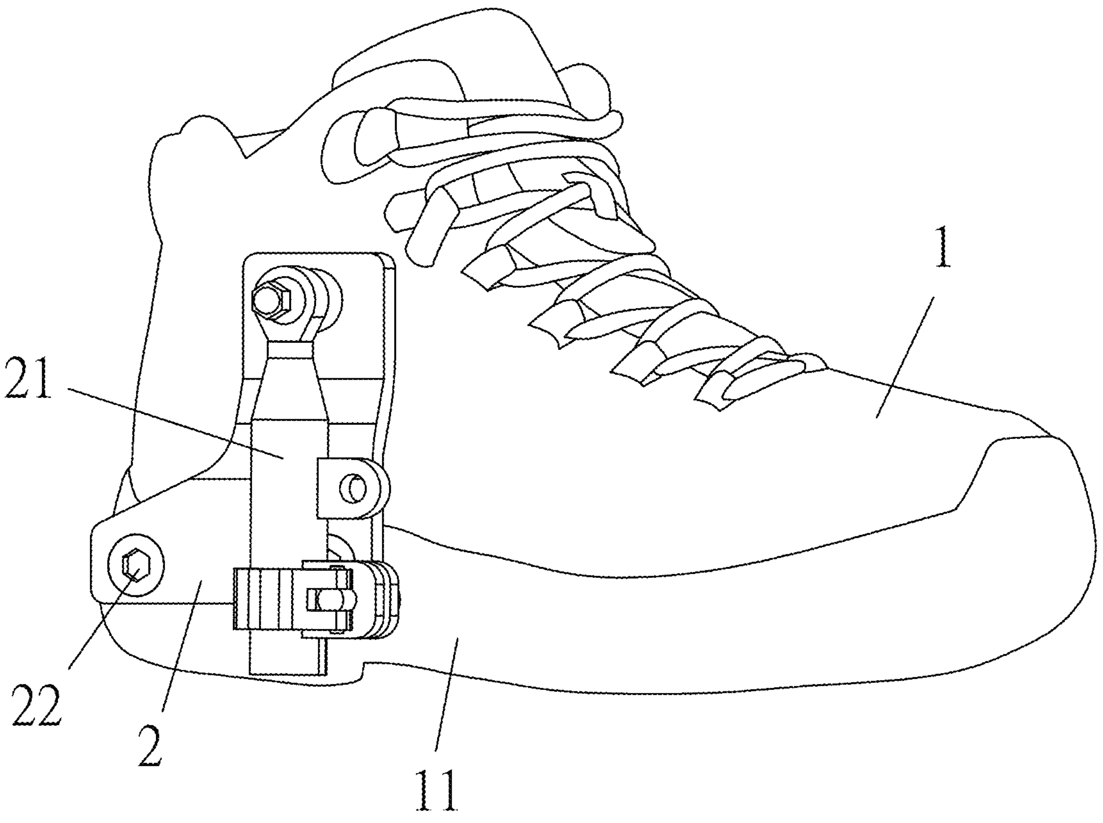
FIG. 1 is a perspective diagram showing the walking-aid footwear according to a first embodiment of the present invention.
Figure 2:
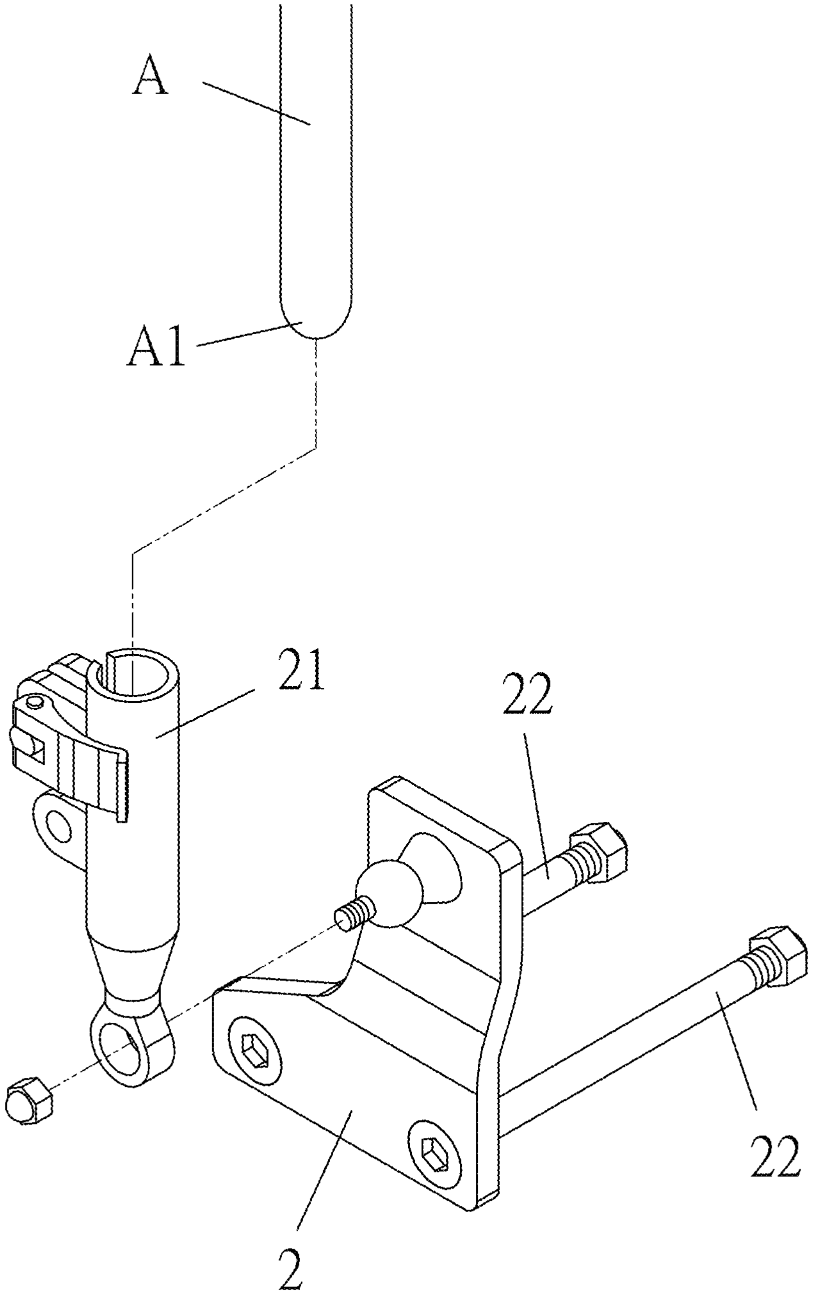
FIG. 2 is a perspective break-down diagram showing the walking-aid footwear of FIG. 1.

As shown in FIGS. 1 and 2, a type of walking-aid footwear according to a first embodiment of the present invention includes a main body 1, which, in this embodiment, is a shoe. The main body 1 includes a coupling device to connect with the lower end portion A1 of a cane A, thereby providing upward assistance from the user's hand holding the cane A to the main body 1. The coupling device includes a support plate 2 and a coupling element 21. The support plate 2 is positioned on the outer side of the main body 1 and can be bent inward to fit the contour of the main body 1. The bottom end of the support plate 2 is attached to the bottom of the main body 1, which is the sole 11. The coupling element 21 is rotatably connected to the top end of the outer side of the support plate 2 and is designed to connect with the lower end portion A1 of the cane A, allowing the coupling element 21 to rotate in all directions, in sync with the user's hand movements.

As shown in FIG. 2, the support plate 2 is attached to the bottom of the main body 1 using screws. If the strength of the bottom of the main body 1 is insufficient, it can include at least one laterally extending reinforcement (not shown) at the bottom of the main body 1. The reinforcement (not shown) can be aligned with the direction of the fastening screw 22. For example, a tube that laterally penetrates through the sole 11 of the main body 1 can be used as the reinforcement (not shown), allowing the fastening screw 22 to pass through the tube and connect with a nut, thereby bearing the force generated by the fastening screw 22 and the nut. In the present embodiment, the coupling element 21 is a clamp that grips the outer side of the lower portion A1 of the cane A. The lower portion A1 of the cane A in FIG. 2 is cylindrical, allowing the clamp to grip around the lower portion A1. This embodiment can also be used with existing canes A (as the lower portion A1 of most conventional canes A is cylindrical), increasing user acceptance. The clamp can be tightened or loosened around the lower portion A1 by operating a lever.

Figure 3:
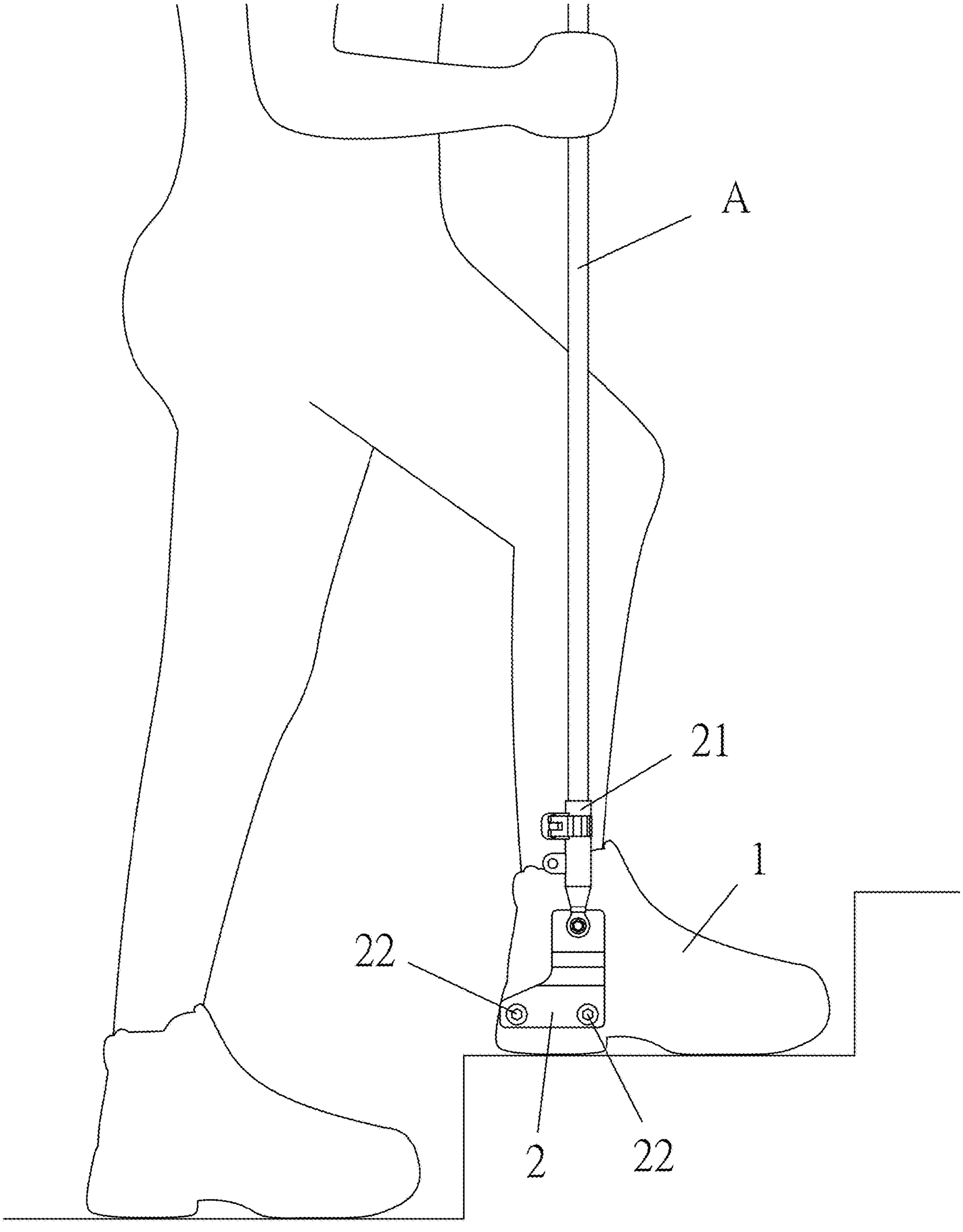
FIG. 3 is a schematic diagram showing an application scenario of the walking-aid footwear of FIG. 1.

As shown in FIG. 3, when performing actions that require lifting the foot, such as walking, climbing stairs, or ascending a slope, the user can clamp the coupling element 21 onto the lower portion A1 of the cane A. By holding the cane A and applying upward force with the hand, the user can assist in lifting the main body 1 and the foot, compensating for insufficient leg strength and achieving the effect of assisted walking. Additionally, when the user wearing the present invention needs to rise from a seated position, they can use the cane A to help stand up.

Figure 4:
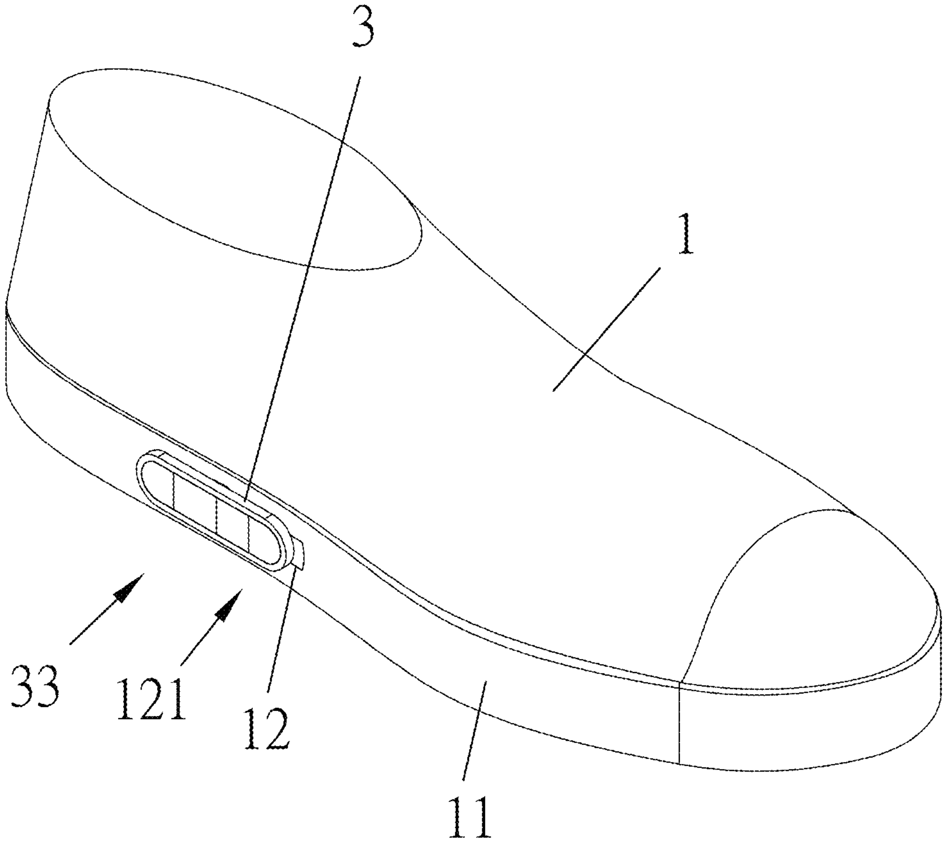
FIG. 4 is a perspective diagram showing the walking-aid footwear according to a second embodiment of the present invention.
Figure 5:
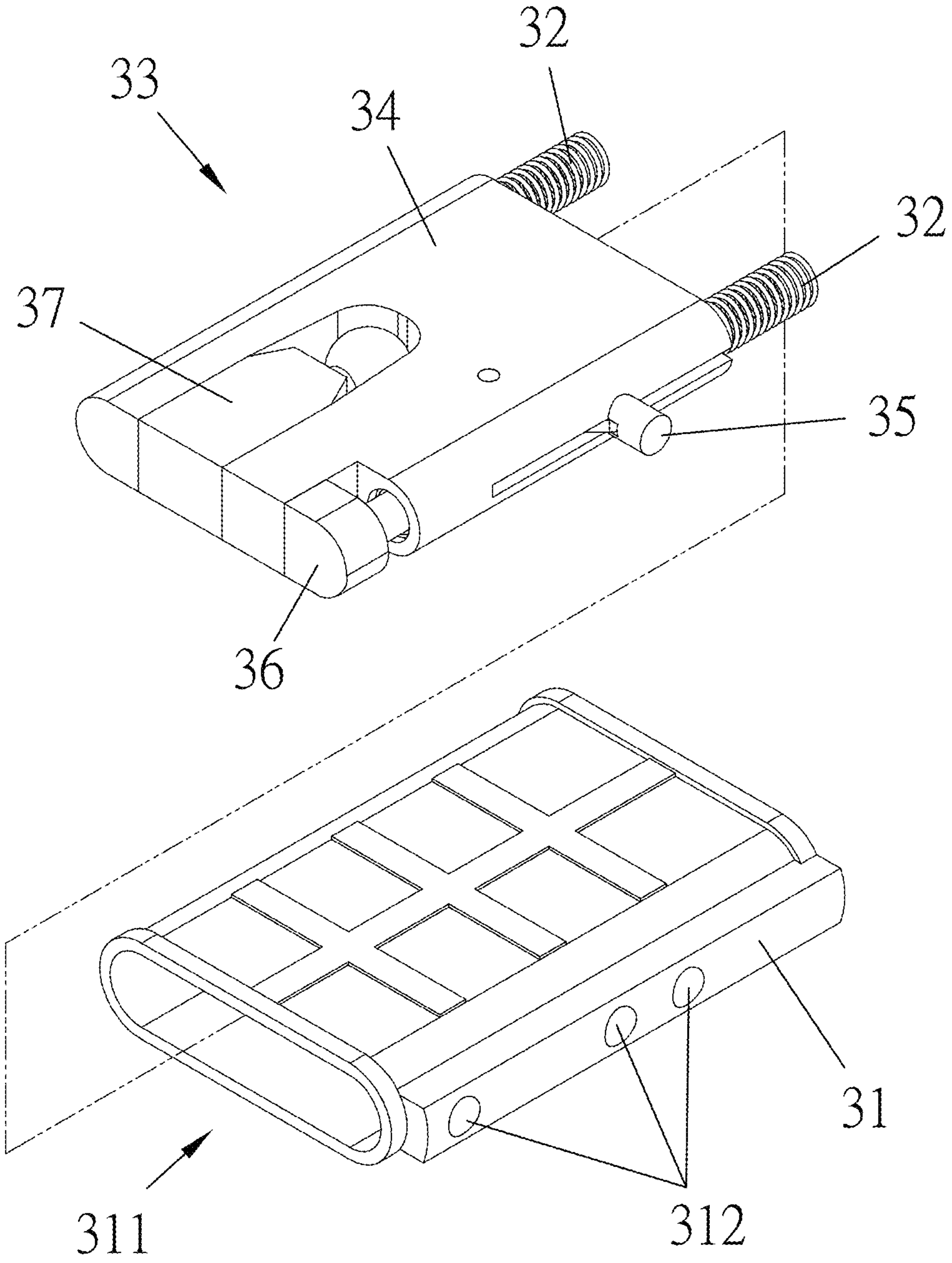
FIG. 5 is a perspective breakdown diagram showing a coupling device of the walking-aid footwear of FIG. 4.
Figure 6:
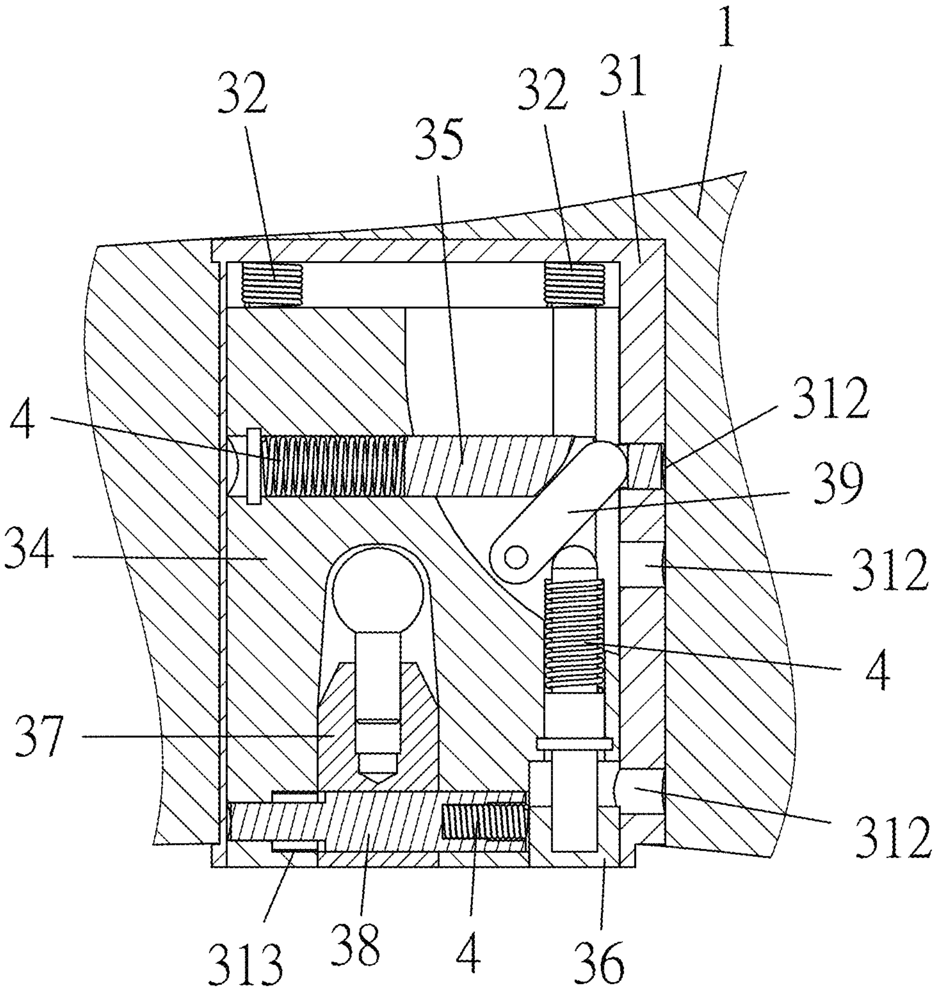
FIG. 6 is a sectional diagram showing the walking-aid footwear of FIG. 4.

As shown in FIGS. 4 to 6, which depict a second embodiment of the present invention, the main body 1 is a shoe and the bottom (sole 11) of the main body 1 contains a housing space 12. The housing space 12 has a shoe body opening 121 facing the outer side of the main body 1. A coupling device 3 is installed within the housing space 12. The coupling device 3 includes a casing 31, several release springs 32, and a coupling module 33. The casing 31 has a housing opening 311 facing the outer side of the main body 1. The coupling module 33 is slidably installed inside the casing 31. Each release spring 32 is attached to the side of the casing 31 near the inner side of the main body 1, with the default position of each release spring 32 pushing the coupling module 33 out of the housing opening 311. The release springs 32 can also be attached to the side of the coupling module 33 facing the inner side of the main body 1. The coupling module 33 consists of a box 34, a latch pin 35, an operation button 36, and a coupling element 37. The operation button 36 is located to an end of the front side of the box 34. The latch pin 35 is slidably installed within the box 34 and protrudes from the box 34 on one side, either near the front or rear side of the main body 1. The casing 31 has several notches 312 arranged at interval on the inner side, corresponding to the latch pin 35. When the operation button 36 is pressed, the latch pin 35 disengages from one of the notches 312. At an end of the box 34, near the outer side of the main body 1, an axle 38 is configured, and the coupling element 37 is attached to the axle 38, allowing it to flip from a horizontal to an upright position. The coupling element 37 is designed to correspond to the lower portion A1 of a cane A, enabling the cane A to be rotatably and detachably connected to the coupling element 37.

In the present embodiment, the operation button 36 is located on a side of the box 34 near the front side of the main body 1. When the operation button 36 is pressed, it moves towards the inner side of the main body 1. The latch pin 35 protrudes from the side of the box 34 that is near the front side of the main body 1. A return spring 4 at the rear end of the latch pin 35 is set to push the latch pin 35 out of the box 34 by default. The movement direction of the latch pin 35 is perpendicular to the movement direction of the operation button 36. One end of a connecting rod 39 is rotatably connected to the latch pin 35, and the other end is rotatably connected inside the box 34, away from the end where the latch pin 35 protrudes. This positioning makes the connecting rod 39 closer to the operation button 36 than the latch pin 35, forming a predetermined angle between them. When the operation button 36 moves towards the inner side of the main body 1, its end pushes the connecting rod 39 to rotate inward as well. This rotational movement of the connecting rod 39 converts into a force that drives the latch pin 35 to move inward. Thus, when the operation button 36 pushes the connecting rod 39, the latch pin 35 moves inside the box 34, disengaging from one of the notches 312. The operation button 36 is fitted with another return spring 4, which resets the operation button 36 after the user releases it. Similarly, the return spring 4 of the latch pin 35 pushes the latch pin 35 back out of the box 34.

In the present embodiment, the axle 38 has a hollow structure with an opening at one end and is equipped with another return spring 4 inside. The axle 38 is slidably installed in the box 34, with the return spring 4 of the axle 38 set to push the axle 38 in the direction towards the rear side of the main body 1. Therefore, the opening of the axle 38 faces the front side of the main body 1 to accommodate the return spring 4. The axle 38 can be pushed in the direction opposite to the latch pin 35. On the outer side of the axle 38, there is at least one protrusion 381, and the box 34 has several slots 313 corresponding to the protrusions 381. When the coupling element 37 is flipped, it causes the axle 38 to rotate, so that the protrusion 381 rotates to the position corresponding to another slot 313 as the coupling element 37 flips. When the return spring 4 pushes the axle 38 to the position where it protrudes from the box 34, the protrusion 381 snaps into at least one of the slots 313. In the present embodiment, the protrusion 381 is flat, while the slot 313 is cross-shaped, allowing the protrusion 381 to snap into the slots 313 at positions spaced 90 degrees apart, corresponding to the horizontal or vertical position of the coupling element 37. When the user wants to flip the coupling element 37, they need to press the axle 38 to release the protrusion 381 from the slot 313, allowing the coupling element 37 to be flipped upward. After the flipping is complete, releasing the axle 38 causes the protrusion 381 to snap back into the slot 313, fixing the position of the coupling element 37 and preventing it from falling.

Figure 7:
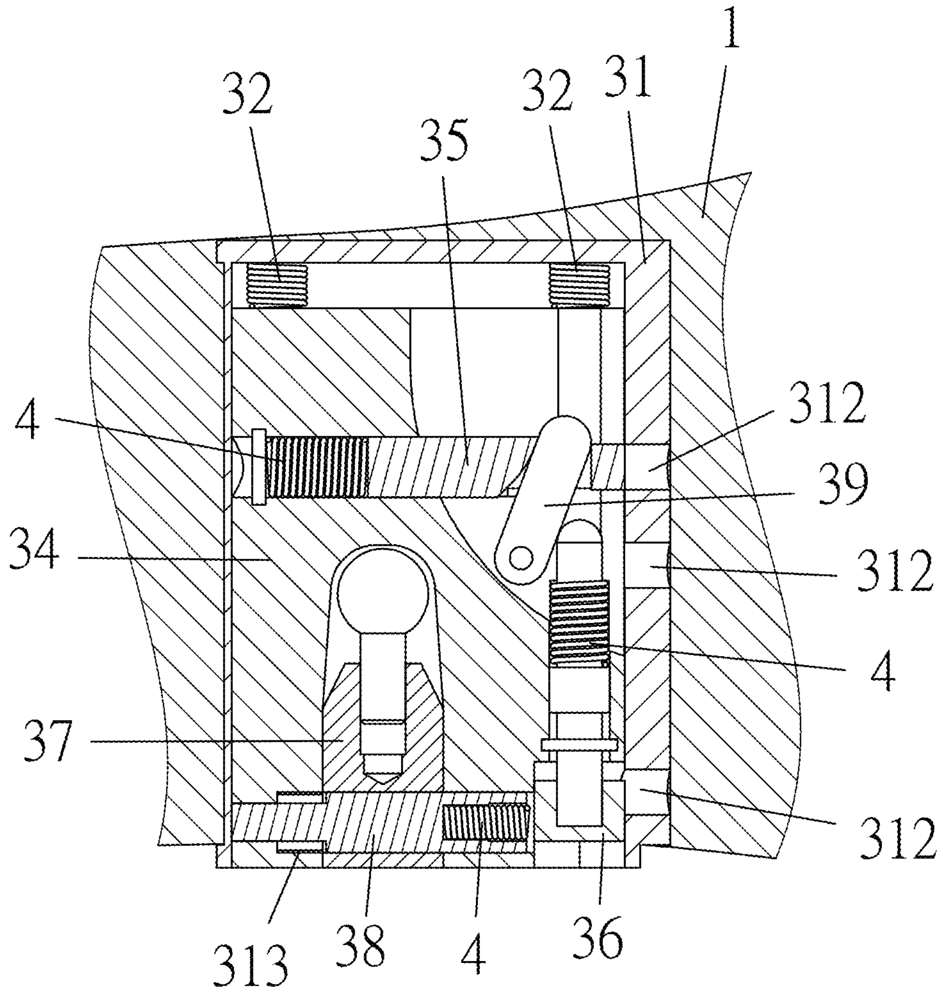
FIG. 7 is another sectional diagram showing the walking-aid footwear of FIG. 4.
Figure 8:
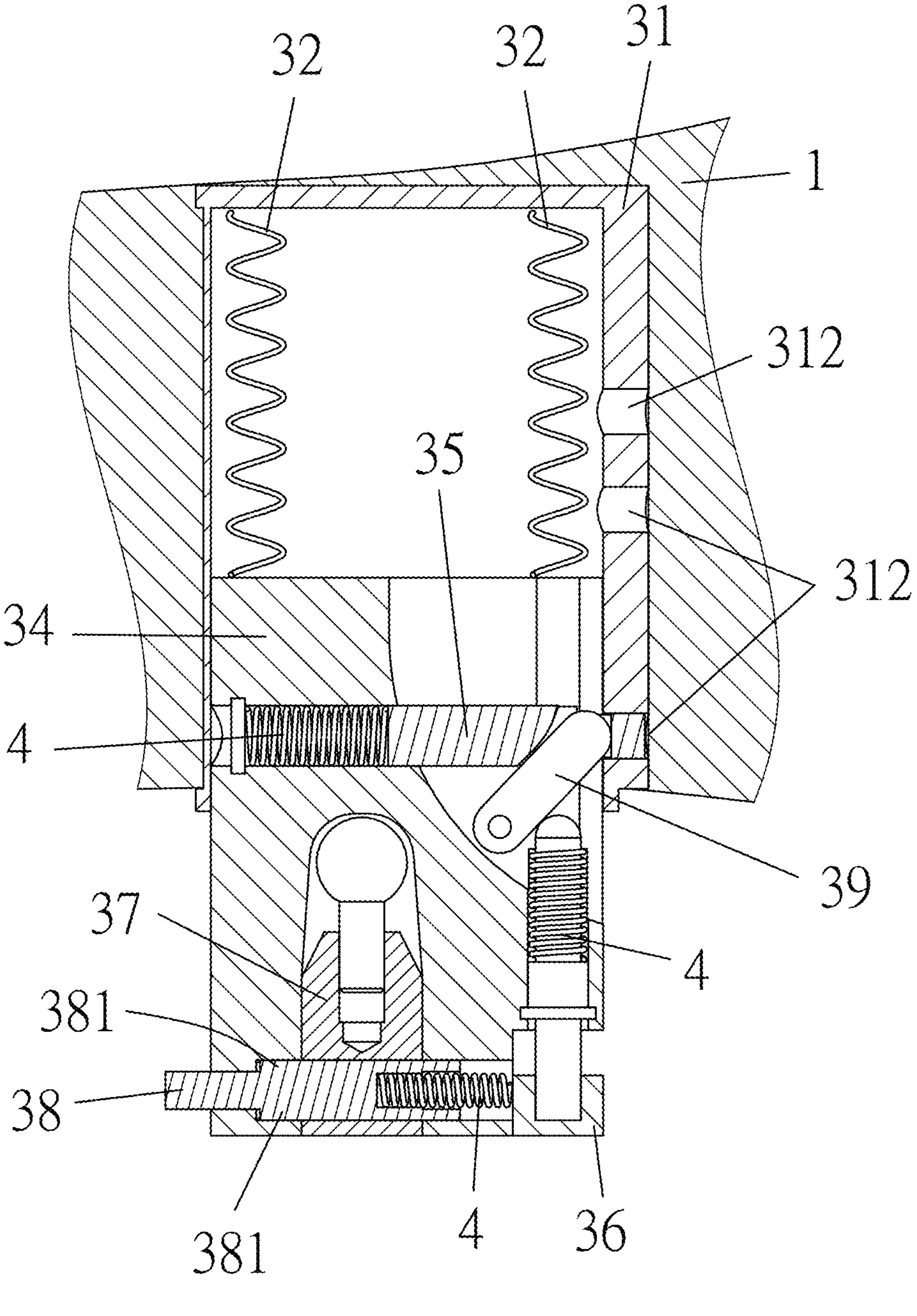
FIG. 8 is another sectional diagram showing the walking-aid footwear of FIG. 4.

As shown in FIGS. 6 to 8, in the horizontal cross-sectional view, it can be seen that, in the present embodiment, the casing 31 has three notches 312 arranged in parallel on the side near the front of the main body 1 (right side in the figure), each corresponding to the latch pin 35. The uppermost notch 312 corresponds to the position of the coupling module 33 in its storage state. The lowermost notch is for the position where the user wants to flip up the coupling element 37, and the middle notch is for the position where the flipped-up coupling element 37 is close to the main body 1. The latch pin 35 is initially pushed into one of the notches 312 by the return spring 4. When the user presses the operation button 36, the latch pin 35 moves out of one of the notches 312, allowing the release springs 32 to push the coupling module 33 toward the housing opening 311. This enables the latch pin 35 to be inserted into another notch 312, or the user can continue holding down the operation button 36 while gripping and pulling out the coupling module 33 for cleaning or replacement purposes.

Figure 9:
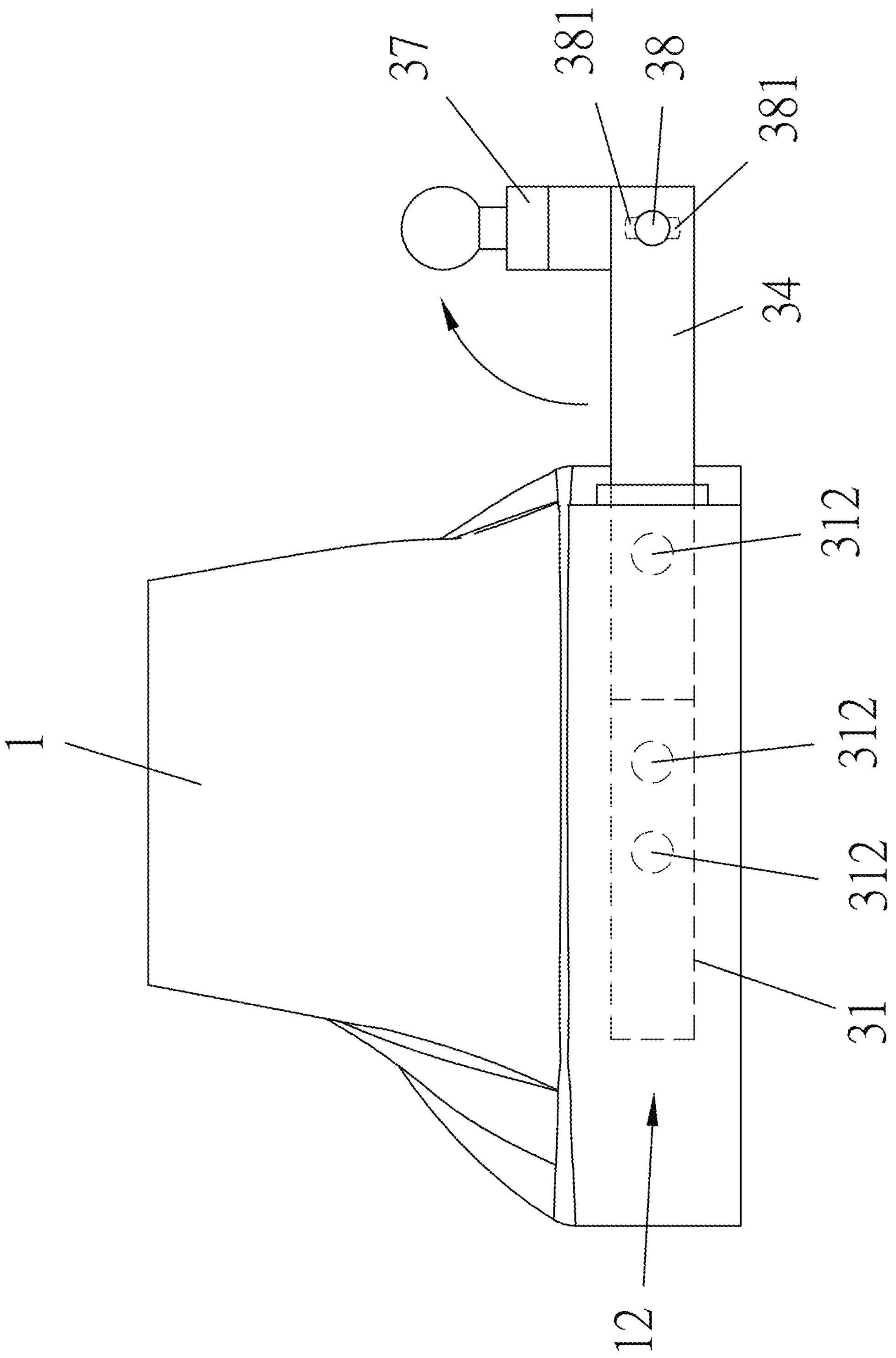
FIG. 9 is a rear-view diagram showing the walking-aid footwear of FIG. 4.
Figure 10:
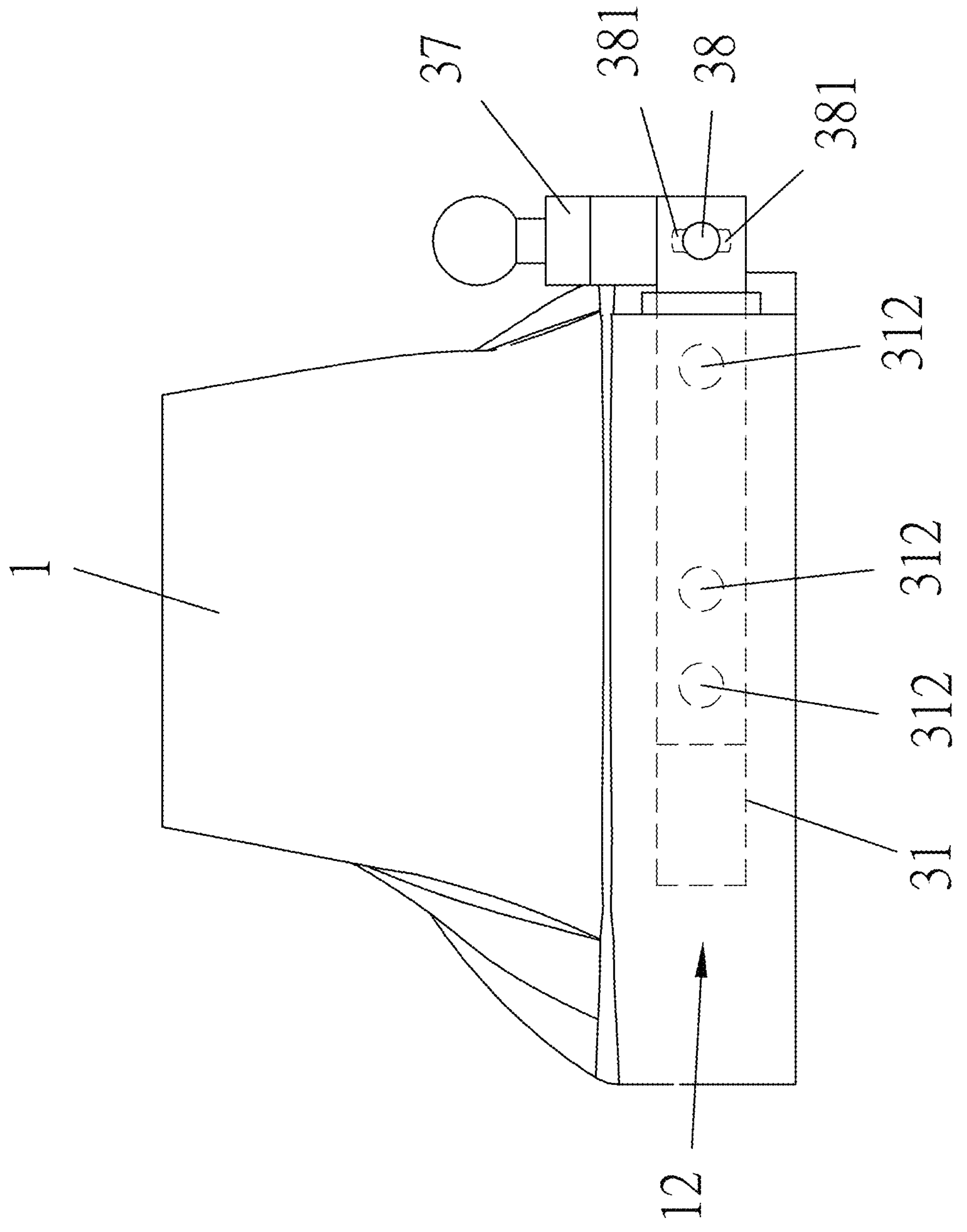
FIG. 10 is another rear-view diagram showing the walking-aid footwear of FIG. 4.
Figure 11:
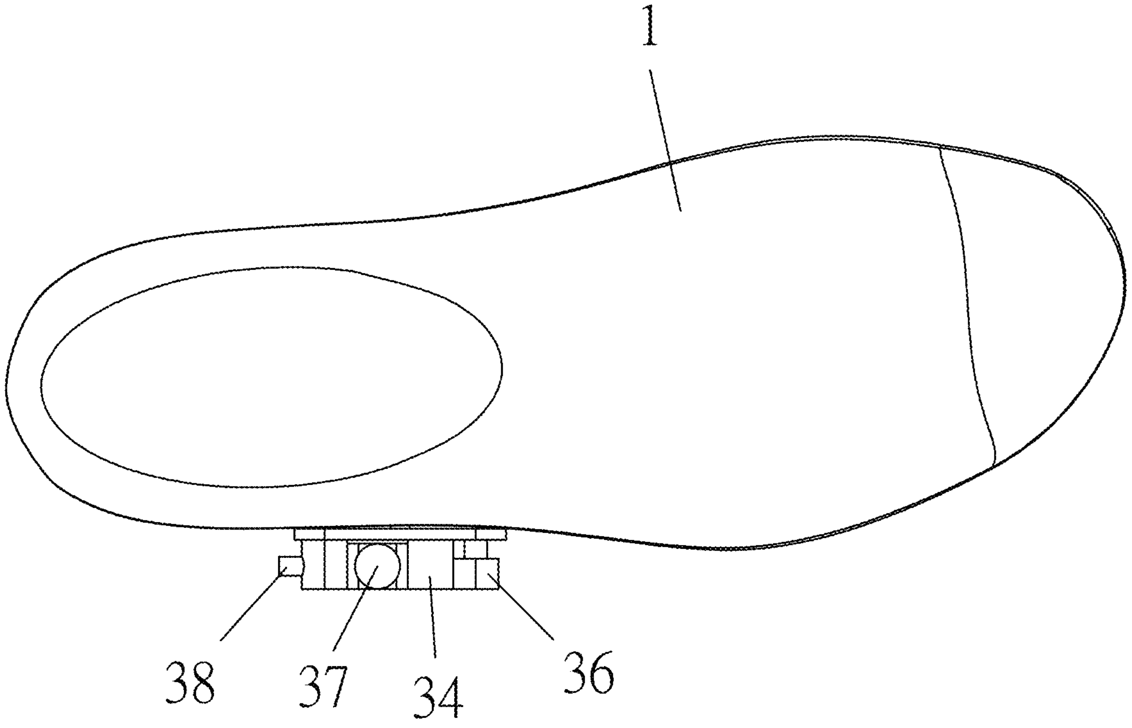
FIG. 11 is a top-view diagram showing the walking-aid footwear of FIG. 10.

To use the present embodiment, a user presses the operation button 36 so that the latch pin 35 disengages from the notch 312 in the default position. Then, the coupling module 33, as shown in FIG. 7, is pushed toward the housing opening 311 by the release springs 32. The multiple notches 312 corresponding to the latch pin 35 allow the coupling module 33 to stop at different positions. The user can repeatedly press the operation button 36 to let the release springs 32 push the coupling module 33 to the desired position, or they can keep the operation button 36 pressed and directly move the coupling module 33 to the desired position. Once the user moves the coupling module 33 to an appropriate position, as shown in FIG. 8, there will be enough space to flip the coupling element 37 to an upright position, as depicted in FIG. 9. At the same time, the position of the protrusion 381 on the axle 38 changes with the flipping of the coupling element 37. In FIG. 8, the protrusion 381 is in a horizontal position, while in FIG. 9, it is in a vertical position. Next, as shown in FIG. 10, the user pushes the coupling module 33 back into an appropriate position within the casing 31, reducing the torque exerted on the coupling module 33 when the user lifts their foot. The user can then connect the lower portion A1 of the cane A to the coupling element 37 to start using the present embodiment. Note that FIGS. 9 and 10 are rear views of the present embodiment. The top of the coupling element 37 in the present embodiment is spherical. As shown in FIG. 11, when the coupling module 33 moves outside the casing 31 and the axle 38 is no longer in contact with the casing 31, the return spring 4 of the axle 38 pushes the axle 38 out, causing it to protrude from the box 34, and the protrusion 381 snaps into at least one of the slots 313. To retract the coupling element 37, the user can use the operation button 36 to pull out the coupling module 33, then press down on the axle 38 to flip the coupling element 37 back to the horizontal position. Finally, the user can use the operation button 36 to push the coupling module 33 back into the storage position.

Figure 12:
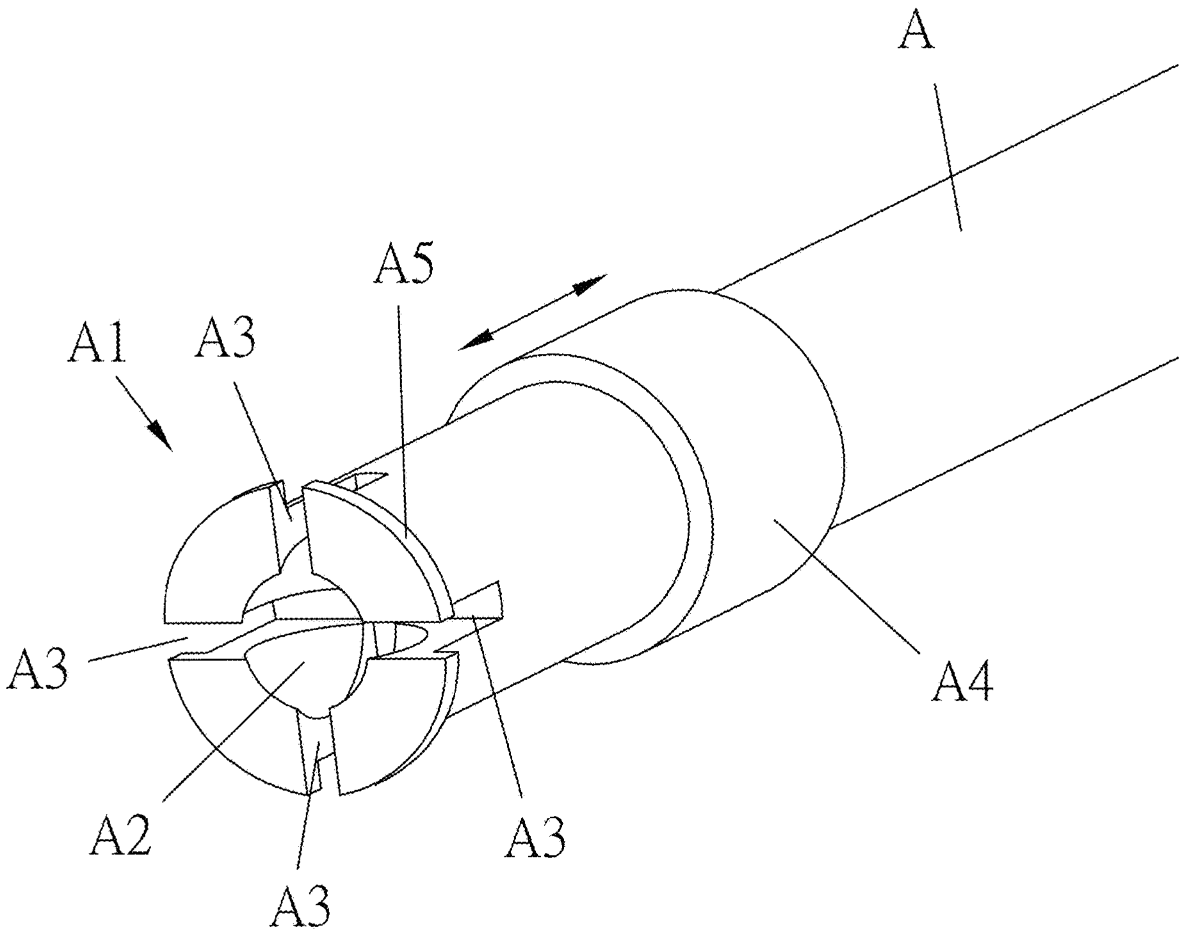
FIG. 12 is a perspective diagram showing a cane designed for working with the walking-aid footwear of FIG. 4.

As shown in FIG. 12, a cane A designed to work with the present embodiment has its lower portion A1 as a spherical socket A2, with multiple open grooves A3 radially extended toward its circumference. These open grooves A3 allow the spherical socket A2 to slightly expand when being fitted onto the coupling element 37, making it easier to connect the cane A with the coupling element 37. The spherical socket A2 can also have an outer sleeve A4 that can move up and down. Before the spherical socket A2 is combined with the coupling element 37, the user first moves the outer sleeve A4 upward, away from the spherical socket A2. Once the coupling element 37 is engaged with the spherical socket A2, the user then moves the outer sleeve A4 down to cover the outside of the spherical socket A2, restricting its expansion and making it difficult for the coupling element 37 to detach from the spherical socket A2. Additionally, the spherical socket A2 may have a lateral flange A5 extending outward. This flange A5 prevents the outer sleeve A4 from sliding off the cane A by catching it when the sleeve A4 is moved downward. With the spherical socket A2, the lower portion A1 of the cane A, once combined with the coupling element 37, can rotate in all directions, accommodating the user's hand movements.

Figure 13:
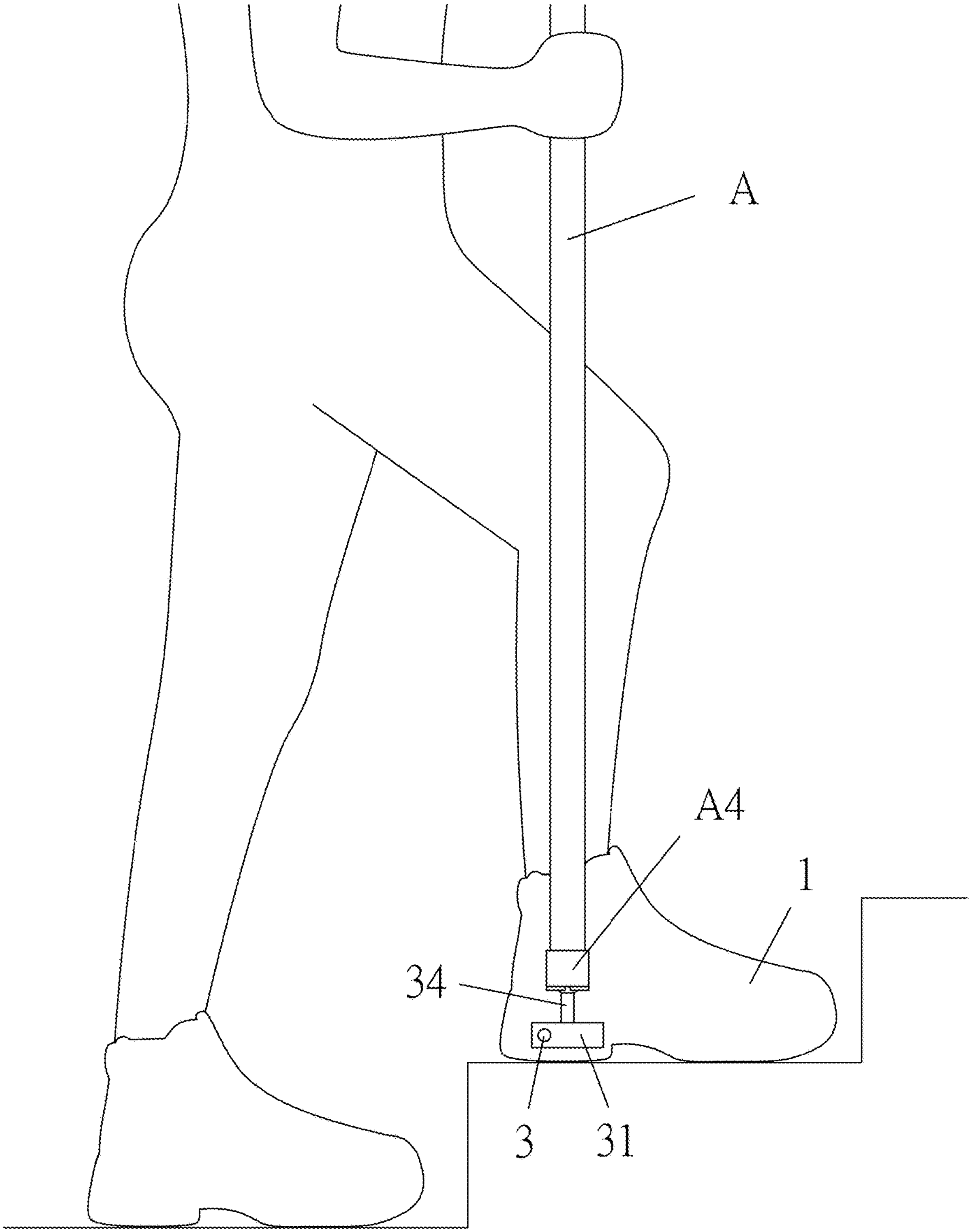
FIG. 13 is a schematic diagram showing an application scenario of the walking-aid footwear of FIG. 4.

As shown in FIG. 13, when the user needs to perform actions that require lifting the foot, such as walking, climbing stairs, or ascending a slope, they can combine cane A with the coupling element 37. By holding the cane A and applying upward force with their hand, the user can assist in lifting the main body 1 and their foot, compensating for insufficient leg strength and achieving the effect of assisted walking. Additionally, the appearance of the second embodiment is no different from that of a regular shoe, making it highly acceptable to users. When a user wearing the present embodiment needs to rise from a seated position, they can also use cane A to help stand up.

Figure 14:
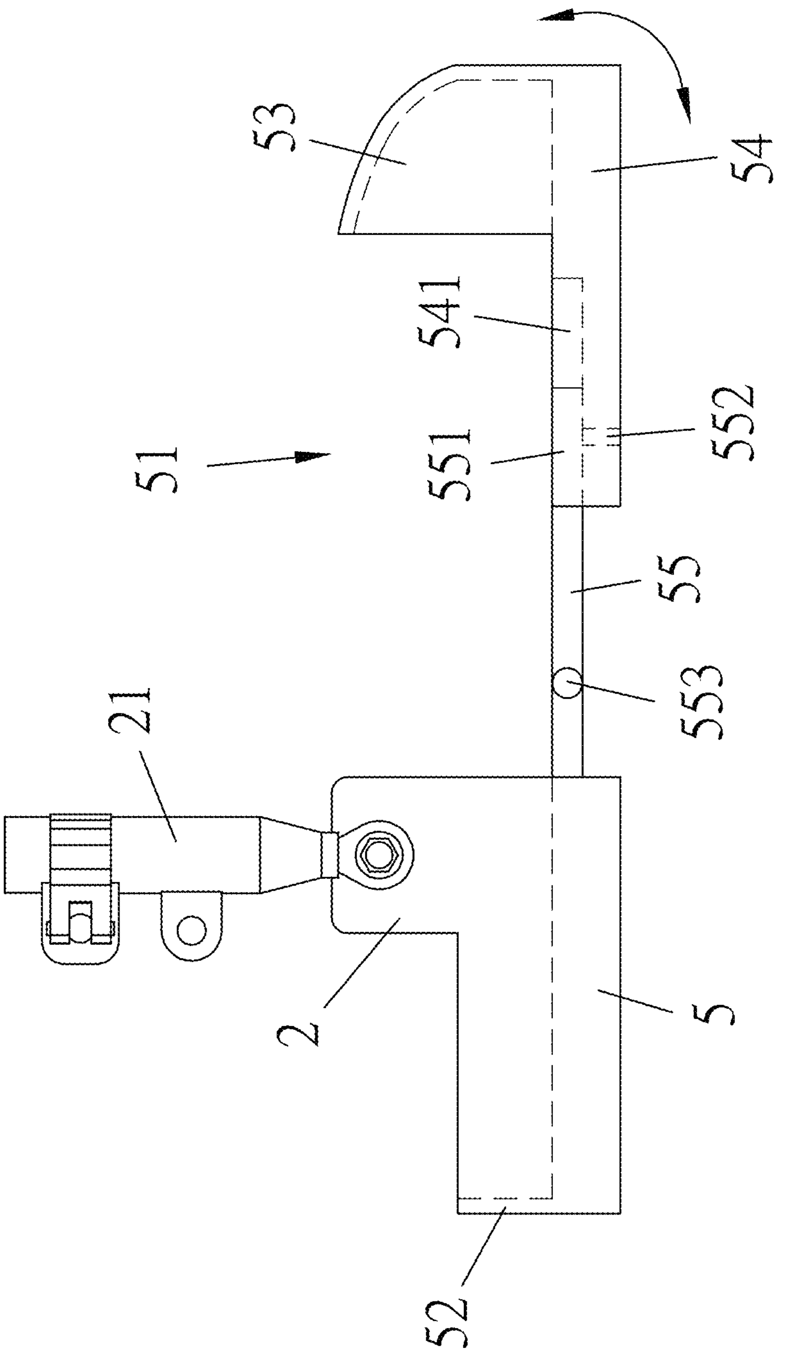
FIG. 14 is a schematic diagram showing the walking-air footwear according to a third embodiment of the present invention.

In a third embodiment of the present invention, as shown in FIG. 14, the main body 1 is a base plate 5 on which a shoe is placed. The coupling device 3 includes a support plate 2 and a coupling element 21. The support plate 2 stands on the outer side of the main body 1, with its bottom end attached to the main body 1. The coupling element 21 is rotatably connected to the top end of the outer side of the support plate 2 to connect with the lower portion A1 of a cane A. A front end of the base plate 5 is rotatably connected to an extendable front plate 51, and a support section 52 extends upward from the rear end of the base plate 5. The front end of the extendable front plate 51 has a socket 53 to cover the toe of the shoe, preventing it from slipping off in the present embodiment. The extendable front plate 51 and the base plate 5 may each have a fastening device (not shown) to secure the shoe, such as straps or buckles, in addition to the socket 53. The support section 52 may have a curved shape to support the back of the shoe, and the socket 53 and support section 52 may also include padding (not shown) to fit snugly against the shoe. The extendable front plate 51 can be adjusted in length to accommodate different shoe sizes.

In the present embodiment, the extendable front plate 51 includes a sliding section 54 and a rotating section 55. The rotating section 55 is rotatably connected to the front end of the base plate 5. The sliding section 54 has a slot 541 aligned with the rotating section 55. The rotating section 55 has an extended part 551 that slides within the slot 541. The slot 541 is equipped with a locking mechanism to secure the position of the extended part 551 within the slot. The locking mechanism is a tightening screw 552. The tightening screw 552 is locked from the underside of the slot 541. By tightening the screw 552, the user can secure the extended part 551 in place within the slot 541, thus fixing the length of the present embodiment. When the user loosens the tightening screw 552, the extended part 551 is released, allowing the user to adjust the length of the present embodiment.

To use the present embodiment, a user does not need to take off the shoes. First, the user loosens the tightening screw 552 and pulls out the sliding section 54. Then, place the shoe on the base plate 5, with the back of the shoe resting against the support section 52. Next, the user pulls the sliding section 54 back until the socket 53 rest against the toe of the shoe. After that, the user tightens the tightening screw 552 to secure the position, tightly fastening the present embodiment to the shoe. Finally, the user connects the coupling element 21 with the lower portion A1 of the cane A to start using the present embodiment. The rotating section 55 has a rotating hinge 553 positioned to correspond to the arch of the foot. One end of the rotating hinge 553 is attached to the base plate 5, while the other end is connected to the extended part 551. This means the pivot point of the rotating section 55 is located at the position corresponding to the arch, allowing the rotating section 55 to rotate smoothly along with the curvature of the foot, facilitating smoother walking.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A walking-aid footwear, comprising a main body, wherein the main body comprises a coupling device to connect with a lower portion of a cane, thereby providing upward assistance from a user's hand holding the cane to the main body, the main body is a shoe; the main body comprises a housing space; the housing space has a shoe body opening facing an outer side of the main body; the coupling device is installed within the housing space; the coupling device comprises a casing, a plurality of release springs, and a coupling module; the casing has a housing opening facing the outer side of the main body; the coupling module is slidably installed inside the casing; each release spring is attached to a side of the casing near an inner side of the main body, with a default position of each release spring pushing the coupling module out of the housing opening; the coupling module comprises a box, a latch pin, an operation button, and a coupling element; the operation button is located to an end of a front side of the box; the latch pin is slidably installed within the box and protrudes from the box on one side, either near the front or rear side of the main body; the casing has a plurality of notches arranged at intervals on an inner side corresponding to the latch pin; when the operation button is pressed, the latch pin disengages from one of the notches; at an end of the box, near an outer side of the main body, an axle is configured, and the coupling element is attached to the axle, allowing the coupling element to flip from a horizontal to an upright position; the coupling element corresponds to the lower portion of the cane, enabling the cane to be rotatably and detachably connected to the coupling element.

2. The walking-aid footwear according to claim 1, wherein the operation button is located on a side of the box near the front side of the main body; when the operation button is pressed, the operation button moves towards an inner side of the main body; the latch pin protrudes from a side of the box that is near the front side of the main body; a return spring at a rear end of the latch pin is set to push the latch pin out of the box by default; one end of a connecting rod is rotatably connected to the latch pin, and another end of the connecting rod is rotatably connected inside the box, away from the end where the latch pin protrudes, making the connecting rod closer to the operation button than the latch pin and forming a predetermined angle between the operation button and the connecting rod; when the operation button pushes the connecting rod, the latch pin moves inside the box, disengaging from one of the notches; and the operation button is fitted with another return spring, which resets the operation button after the operation button is released.

3. The walking-aid footwear according to claim 2, wherein the axle has a hollow structure with an opening at one end and is equipped with a return spring inside; the axle is slidably installed in the box, with the return spring of the axle set to push the axle in a direction towards the rear side of the main body; on an outer side of the axle there is at least one protrusion, and the box has a plurality of slots corresponding to the at least one protrusion; when the coupling element is flipped, the axle rotates so that the at least one protrusion rotates to a position corresponding to a slot; the return spring pushes the axle to the position and the at least one protrusion snaps into at least one of the slots.

4. The walking-aid footwear according to claim 1, wherein the coupling element is spherical; the lower portion of the cane has a spherical socket with a plurality of open grooves radially extending outward.

5. The walking-aid footwear according to claim 4, wherein an outside of the spherical socket is configured with a vertically movable outer sleeve.

6. The walking-aid footwear according to claim 5, wherein the spherical socket has a lateral flange extending outward.

* * * * *